United States Patent
Liu et al.

(10) Patent No.: US 11,657,638 B2
(45) Date of Patent: May 23, 2023

(54) ULTRASONIC FINGERPRINT SENSOR APPARATUS, METHOD OF OPERATING ULTRASONIC FINGERPRINT SENSOR APPARATUS, AND METHOD OF FABRICATING ULTRASONIC FINGERPRINT SENSOR APPARATUS

(71) Applicant: BOE Technology Group Co., Ltd., Beijing (CN)

(72) Inventors: Yingming Liu, Beijing (CN); Haisheng Wang, Beijing (CN); Yanling Han, Beijing (CN); Yuzhen Guo, Beijing (CN); Lijun Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 541 days.

(21) Appl. No.: 16/957,219

(22) PCT Filed: Sep. 27, 2019

(86) PCT No.: PCT/CN2019/108569
§ 371 (c)(1),
(2) Date: Jun. 23, 2020

(87) PCT Pub. No.: WO2021/056421
PCT Pub. Date: Apr. 1, 2021

(65) Prior Publication Data
US 2023/0087503 A1 Mar. 23, 2023

(51) Int. Cl.
*G06K 9/20* (2006.01)
*G06V 40/13* (2022.01)
*B06B 1/06* (2006.01)

(52) U.S. Cl.
CPC ........ *G06V 40/1306* (2022.01); *B06B 1/0692* (2013.01)

(58) Field of Classification Search
CPC ............... G06V 40/1306; B06B 1/06–1/0696
See application file for complete search history.

(56) References Cited

U.S. PATENT DOCUMENTS 9,607,203 B1 * 3/2017 Yazdandoost ...... G06V 40/1306
2018/0213333 A1 7/2018 Kitchens, II et al.
(Continued)

FOREIGN PATENT DOCUMENTS

CN 207719247 U * 8/2018
CN 110276325 A 9/2019

OTHER PUBLICATIONS

The Extended European Search Report in the European Patent Application No. 19945411.7, dated Sep. 13, 2022.

*Primary Examiner* — Brian Werner
(74) *Attorney, Agent, or Firm* — Intellectual Valley Law, P.C.

(57) ABSTRACT

An ultrasonic fingerprint sensor apparatus is provided. The ultrasonic fingerprint sensor apparatus includes an array of a plurality of ultrasonic sensors on a base substrate. A respective one of the plurality of ultrasonic sensors includes a first electrode, a second electrode, and a piezoelectric layer between the first electrode and the second electrode. The ultrasonic fingerprint sensor apparatus further includes a plurality of bias lines respectively electrically connected to a plurality of columns of ultrasonic sensors in the array of the plurality of ultrasonic sensors. The ultrasonic fingerprint sensor apparatus further includes a polarization electrode; a first lead line electrically connected to the polarization electrode; and a second lead line electrically connected to the plurality of bias lines. The first lead line and the second lead line are in a peripheral region of the ultrasonic fingerprint sensor apparatus.

20 Claims, 8 Drawing Sheets

(56) References Cited

U.S. PATENT DOCUMENTS

2018/0236489 A1    8/2018   Bang
2020/0410197 A1   12/2020   Zhao et al.

* cited by examiner

ULTRASONIC FINGERPRINT SENSOR APPARATUS, METHOD OF OPERATING ULTRASONIC FINGERPRINT SENSOR APPARATUS, AND METHOD OF FABRICATING ULTRASONIC FINGERPRINT SENSOR APPARATUS

CROSS-REFERENCE TO RELATED APPLICATION

This application is a national stage application under 35 U.S.C. § 371 of International Application No. PCT/CN2019/108569, filed Sep. 27, 2019, the contents of which are incorporated by reference in the entirety.

TECHNICAL FIELD

The present invention relates to biometric recognition technology, more particularly, to an ultrasonic fingerprint sensor apparatus, a method of operating an ultrasonic fingerprint sensor apparatus, and a method of fabricating an ultrasonic fingerprint sensor apparatus.

BACKGROUND

Fingerprint recognition technology has been widely used in many fields, such as mobile phones, tablets, televisions, and security protection systems. Various techniques have been used to implement fingerprint recognition, including optical, capacitive and ultrasonic imaging technologies. Ultrasonic fingerprint sensors have many advantages such as its three-dimensional capability, protection with a higher security level, enhanced user experience, better design, and a relative low cost.

SUMMARY

In one aspect, the present invention provides an ultrasonic fingerprint sensor apparatus, comprising an array of a plurality of ultrasonic sensors on a base substrate, wherein a respective one of the plurality of ultrasonic sensors comprises a first electrode, a second electrode, and a piezoelectric layer between the first electrode and the second electrode, an orthographic projection of the first electrode on the base substrate at least partially overlaps with an orthographic projection of the second electrode on the base substrate and at least partially overlaps with an orthographic projection of the piezoelectric layer on the base substrate; a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors; a polarization electrode, wherein an orthographic projection of the polarization electrode on a base substrate is substantially non-overlapping with an orthographic projection of the plurality of ultrasonic sensors on the base substrate; a first lead line electrically connected to the polarization electrode; and a second lead line electrically connected to the plurality of bias lines; wherein the first lead line and the second lead line are in a peripheral region of the ultrasonic fingerprint sensor apparatus.

Optionally, the ultrasonic fingerprint sensor apparatus further comprises a diode connecting the polarization electrode and the plurality of bias lines.

Optionally, an anode of the diode is electrically connected to the polarization electrode; and a cathode of the diode is electrically connected to the plurality of bias lines.

Optionally, the ultrasonic fingerprint sensor apparatus further comprises a transistor connecting the polarization electrode and the plurality of bias lines.

Optionally, a gate electrode and a source electrode of the transistor are commonly electrically connected to the polarization electrode, and a drain electrode of the transistor is electrically connected to the plurality of bias lines.

Optionally, the first lead line and the second lead line are isolated from each other.

Optionally, the polarization electrode is formed to substantially surround the array of a plurality of ultrasonic sensors.

Optionally, the ultrasonic fingerprint sensor apparatus further comprises a plurality of receiver circuits; wherein a respective one of the plurality of receiver circuits is electrically connected to the second electrode in the respective one of the plurality of ultrasonic sensors; wherein the ultrasonic fingerprint sensor apparatus is configured to operate in a time-division mode comprising a signal transmission mode and a signal detection mode; the plurality of receiver circuits are configured to receive fingerprint information respectively from the plurality of ultrasonic sensors in the signal detection mode of the ultrasonic fingerprint sensor apparatus; and the plurality of bias lines are configured to transmit a bias signal in the signal transmission mode respectively to the plurality of columns of ultrasonic sensors in the array of the plurality of ultrasonic sensors.

In another aspect, the present invention provides a method of operating an ultrasonic fingerprint sensor apparatus; wherein the ultrasonic fingerprint sensor apparatus comprises an array of a plurality of ultrasonic sensors on a base substrate, wherein a respective one of the plurality of ultrasonic sensors comprises a first electrode, a second electrode, and a piezoelectric layer between the first electrode and the second electrode, an orthographic projection of the first electrode on the base substrate at least partially overlaps with an orthographic projection of the second electrode on the base substrate and at least partially overlaps with an orthographic projection of the piezoelectric layer on the base substrate; a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors; a polarization electrode, wherein an orthographic projection of the polarization electrode on a base substrate is substantially non-overlapping with an orthographic projection of the plurality of ultrasonic sensors on the base substrate; a first lead line electrically connected to the polarization electrode; a second lead line electrically connected to the plurality of bias lines; and a diode connecting the polarization electrode and the plurality of bias lines; wherein the first lead line and the second lead line are in a peripheral region of the ultrasonic fingerprint sensor apparatus; wherein the method comprises electrically disconnecting the polarization electrode from the plurality of bias lines by maintaining the diode in a reverse bias state.

In another aspect, the present invention provides a method of operating an ultrasonic fingerprint sensor apparatus; wherein the ultrasonic fingerprint sensor apparatus comprises an array of a plurality of ultrasonic sensors on a base substrate, wherein a respective one of the plurality of ultrasonic sensors comprises a first electrode, a second electrode, and a piezoelectric layer between the first electrode and the second electrode, an orthographic projection of the first electrode on the base substrate at least partially overlaps with an orthographic projection of the second electrode on the base substrate and at least partially overlaps with an orthographic projection of the piezoelectric layer on the base substrate; a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors; a polarization electrode, wherein an orthographic projection of the polarization electrode on a base substrate is substantially non-overlapping with an orthographic projection of the plurality of ultrasonic sensors on the base substrate; a first lead line electrically connected to the polarization electrode; a second lead line electrically connected to the plurality of bias lines; and a transistor connecting the polarization electrode and the plurality of bias lines; wherein the first lead line and the second lead line are in a peripheral region of the ultrasonic fingerprint sensor apparatus; wherein the method comprises electrically disconnecting the polarization electrode from the plurality of bias lines by maintaining the transistor in an OFF state.

In another aspect, the present invention provides a method of fabricating an ultrasonic fingerprint sensor apparatus, comprising forming an array of a plurality of ultrasonic sensors on a base substrate, wherein a respective one of the plurality of ultrasonic sensors comprises a first electrode, a second electrode, and a piezoelectric layer between the first electrode and the second electrode; forming a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors; forming a first polarization electrode on a side of the first electrode away from the second electrode, wherein an orthographic projection of the first polarization electrode on a base substrate at least partially overlaps with an orthographic projection of the second electrode on the base substrate and at least partially overlaps with an orthographic projection of the piezoelectric layer on the base substrate; forming a second polarization electrode, wherein an orthographic projection of the second polarization electrode on a base substrate is substantially non-overlapping with the orthographic projection of the plurality of ultrasonic sensors on the base substrate; electrically connecting the second polarization electrode with the plurality of bias lines; and polarizing the piezoelectric layer by providing a first voltage signal to the first polarization electrode, and providing a second voltage signal to the second electrode through the second polarization electrode and the respective one of the plurality of bias lines during polarizing the piezoelectric layer.

Optionally, the second polarization electrode is formed to substantially surround the array of a plurality of ultrasonic sensors.

Optionally, electrically connecting the second polarization electrode with the plurality of bias lines comprises forming a diode between the second polarization electrode and the plurality of bias lines; and the diode is maintained in a bias state allowing the second voltage signal to pass from the second polarization electrode to the respective one of the plurality of bias lines during polarizing the piezoelectric layer.

Optionally, upon completion of polarizing the piezoelectric layer, further comprising maintaining the diode in a reverse bias state thereby electrically disconnecting the second polarization electrode from the plurality of bias lines.

Optionally, electrically connecting the second polarization electrode with the plurality of bias lines comprises forming a transistor between the second polarization electrode and the plurality of bias lines; the transistor is maintained in an ON state during polarizing the piezoelectric layer; and the second voltage signal is provided to the second electrode through the second polarization electrode, the transistor, and the respective one of the plurality of bias lines during polarizing the piezoelectric layer.

Optionally, upon completion of polarizing the piezoelectric layer, further comprising maintaining the transistor in an OFF state, thereby electrically disconnecting the second polarization electrode from the plurality of bias lines.

Optionally, electrically connecting the second polarization electrode with the plurality of bias lines comprises forming a connecting signal line between the second polarization electrode and the plurality of bias lines, thereby directly electrically connecting the second polarization electrode with the plurality of bias lines.

Optionally, the method further comprises cutting the connecting signal line upon completion of polarizing the piezoelectric layer, thereby disconnecting the second polarization electrode from the plurality of bias lines.

Optionally, the array of a plurality of ultrasonic sensors are formed in a respective one of a plurality of regions of a mother substrate; wherein, upon completion of polarizing the piezoelectric layer, the method further comprising cutting the mother substrate thereby forming the ultrasonic fingerprint sensor apparatus; wherein cutting the connecting signal line is performed during cutting the mother substrate.

Optionally, the method further comprises forming a plurality of receiver circuits; wherein a respective one of the plurality of receiver circuits is electrically connected to the second electrode in the respective one of the plurality of ultrasonic sensors; wherein the ultrasonic fingerprint sensor apparatus is configured to operate in a time-division mode comprising a signal transmission mode and a signal detection mode; the plurality of receiver circuits are configured to receive fingerprint information respectively from the plurality of ultrasonic sensors in the signal detection mode of the ultrasonic fingerprint sensor apparatus; and the plurality of bias lines are configured to transmit a bias signal in the signal transmission mode respectively to the plurality of columns of ultrasonic sensors in the array of the plurality of ultrasonic sensors.

Optionally, forming the respective one of the plurality of receiver circuits comprises forming a bias signal diode connecting the respective one of the plurality of bias lines and the second electrode.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an ultrasonic fingerprint sensor apparatus, a method of operating an ultrasonic fingerprint sensor apparatus, and a method of fabricating an ultrasonic fingerprint sensor apparatus that substantially obviate one or more of the problems due to limitations and disadvantages of the related art. In one aspect, the present disclosure provides a method of fabricating an ultrasonic fingerprint sensor apparatus. In some embodiments, the method includes forming an array of a plurality of ultrasonic sensors on a base substrate, wherein a respective one of the plurality of ultrasonic sensors includes a first electrode, a second electrode, and a piezoelectric layer between the first electrode and the second electrode; forming a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors; forming a first polarization electrode on a side of the first electrode away from the second electrode, wherein an orthographic projection of the first polarization electrode on a base substrate at least partially overlaps with an orthographic projection of the second electrode on the base substrate and at least partially overlaps with an orthographic projection of the piezoelectric layer on the base substrate; forming a second polarization electrode, wherein an orthographic projection of the second polarization electrode on a base substrate is substantially non-overlapping with the orthographic projection of the plurality of ultrasonic sensors on the base substrate; electrically connecting the second polarization electrode with the plurality of bias lines; and polarizing the piezoelectric layer by providing a first voltage signal to the first polarization electrode, and providing a second voltage signal to the second electrode through the second polarization electrode and the respective one of the plurality of bias lines during polarizing the piezoelectric layer.

Figure 1:
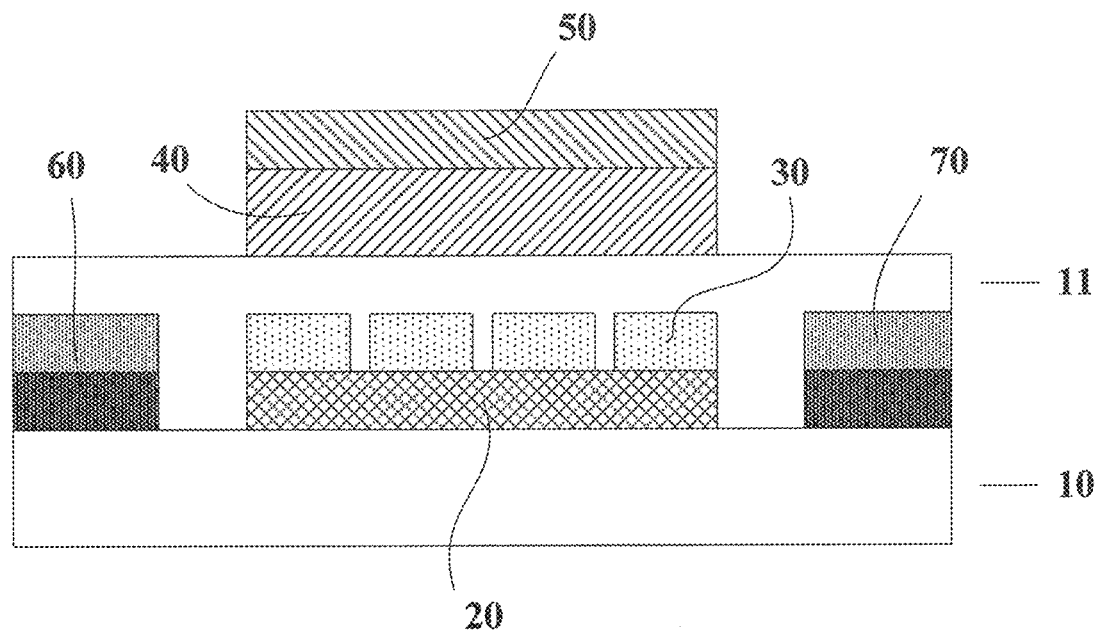
FIG. 1 is a schematic diagram illustrating the structure of an ultrasonic fingerprint sensor apparatus in some embodiments according to the present disclosure.

FIG. 1 is a schematic diagram illustrating the structure of an ultrasonic fingerprint sensor apparatus in some embodiments according to the present disclosure. As shown in FIG. 1, the ultrasonic fingerprint sensor apparatus in some embodiments includes a base substrate 10, a second electrode 30 on the base substrate 10, a piezoelectric layer 40 on a side of the second electrode 30 away from the base substrate 10, and a first electrode 50 on a side of the piezoelectric layer 40 away from the second electrode 30.

Various appropriate piezoelectric materials may be used for making the piezoelectric layer 40. Examples of appropriate piezoelectric materials for making the piezoelectric layer 40 include polyvinylidene fluoride or lead zirconate titanate piezoelectric ceramic. The piezoelectric property of the piezoelectric layer 40 mainly depends on the spontaneous polarization amount formed by the molecular dipole. This polarization value is related to the molecular structure of the piezoelectric material in the piezoelectric layer 40. The piezoelectric layer 40 needs to be polarized to become functional. Upon application of a polarization process, the dipoles of the piezoelectric material in the piezoelectric layer 40 are aligned, e.g., along the direction of the electric field applied during the polarization process, resulting in permanent polarization. In one example, the piezoelectric layer 40 is made of polyvinylidene fluoride. During polarization, the disordered dipole moment of the polyvinylidene fluoride material are aligned, and the polyvinylidene fluoride material is converted from an a crystalline form to a β crystalline form, thereby obtaining its piezoelectric properties.

The amount of charge generated by an ultrasonic fingerprint sensor apparatus in response to a pressure may be calculated using an equation of $Q=d*\delta$, wherein d stands for a pressure applied to the piezoelectric layer 40 vertically (e.g., along a direction intersecting the first electrode 50, the piezoelectric layer 40, and the second electrode 30), Q stands for the amount of charge generated by an ultrasonic fingerprint sensor apparatus in response to the pressure d, and δ stands for a piezoelectric constant. The higher the piezoelectric constant δ, the higher the amount of charge generated by an ultrasonic fingerprint sensor apparatus in response to the pressure d.

Referring to FIG. 1 again, in some embodiments, the ultrasonic fingerprint sensor apparatus further includes a polarization electrode 70, e.g., a portion of an electrode used for polarizing the material in the piezoelectric layer 40 during the polarization process and remained in the ultrasonic fingerprint sensor apparatus after the fabrication process. As shown in FIG. 1, in some embodiments, the ultrasonic fingerprint sensor apparatus further includes a passivation layer 11 between the second electrode 30 and the piezoelectric layer 40. Optionally, the ultrasonic fingerprint sensor apparatus further includes a plurality of receiver circuits 20 connected to the second electrode 30 for receiving electrical signals, and a peripheral circuit 60 in a peripheral region of the ultrasonic fingerprint sensor apparatus.

In the ultrasonic fingerprint sensor apparatus, the ultrasonic wave is reflected by ridges and valleys of a fingerprint toward the piezoelectric layer 40, the reflected ultrasonic signal is converted into electrical signal by the piezoelectric layer 40, and is coupled to the second electrode 30 and transmitted to a respective one of the plurality of receiver circuits 20, thereby detecting a fingerprint information.

Figure 2:
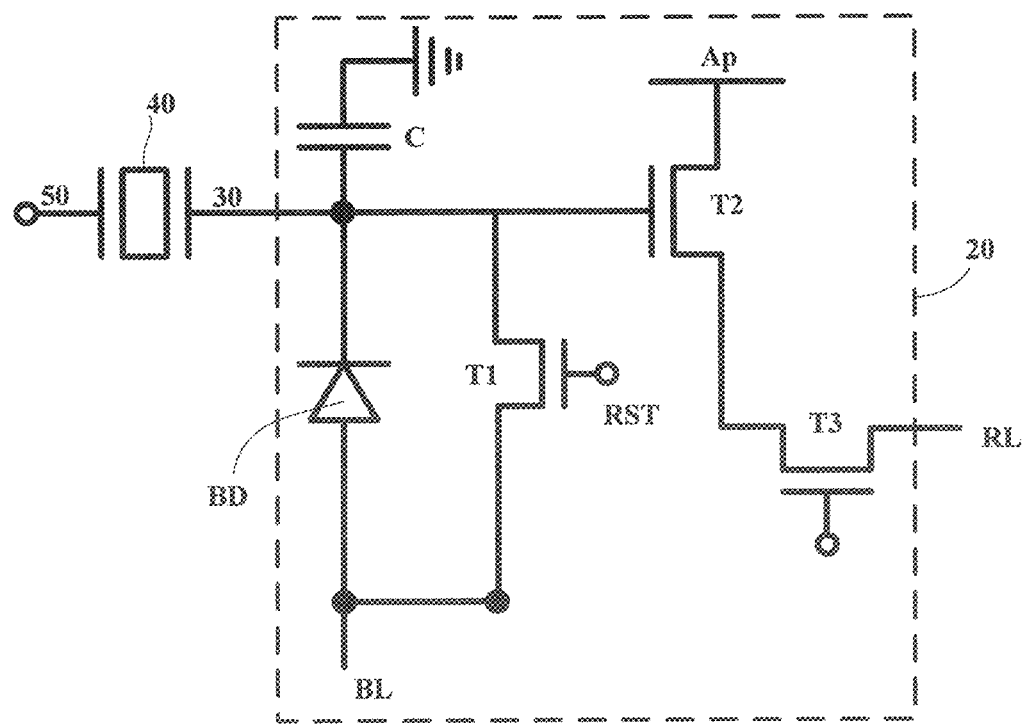
FIG. 2 is a circuit diagram of a fingerprint sensing circuit in an ultrasonic fingerprint sensor apparatus in some embodiments according to the present disclosure.

FIG. 2 is a circuit diagram of a fingerprint sensing circuit in an ultrasonic fingerprint sensor apparatus in some embodiments according to the present disclosure. Referring to FIG. 2, in some embodiments, the ultrasonic fingerprint sensor apparatus is operated to have a transmitting phase and a receiving phase. In the transmitting phase, the first electrode 50 (functioning as a transmitting electrode) is configured to be provided with a transmission voltage signal. The second electrode 30 (functioning as a receiving electrode) is configured to be provided with a low voltage signal (e.g., a bias voltage), by electrically connecting to a respective one of a plurality of bias signal lines BL via a bias signal diode BD while the bias signal diode BD is in an ON state. The bias signal diode BD electrically connects the second electrode 30 and a respective one of the plurality of bias signal lines BL. An anode of the bias signal diode BD is electrically connected to the respective one of the plurality of bias lines BL, and a cathode of the bias signal diode BD is electrically connected to the second electrode 30. A voltage difference between the first electrode 50 and the second electrode 30 renders the piezoelectric layer 40 to generate an ultrasonic signal. The ultrasonic signal is transmitted to a surface of a finger. In the receiving phase, the first electrode 50 is configured to be provided with a direct current low voltage signal. The ultrasonic signal reflected by the surface of the finger passes through the piezoelectric layer 40, and is converted into an electrical signal, which is coupled to the second electrode 30. The second electrode 30 transmits the electrical signal to a respective one of a plurality of read lines RL, which is connected to a detection circuit, thereby recognizing fingerprint information.

Figure 3:
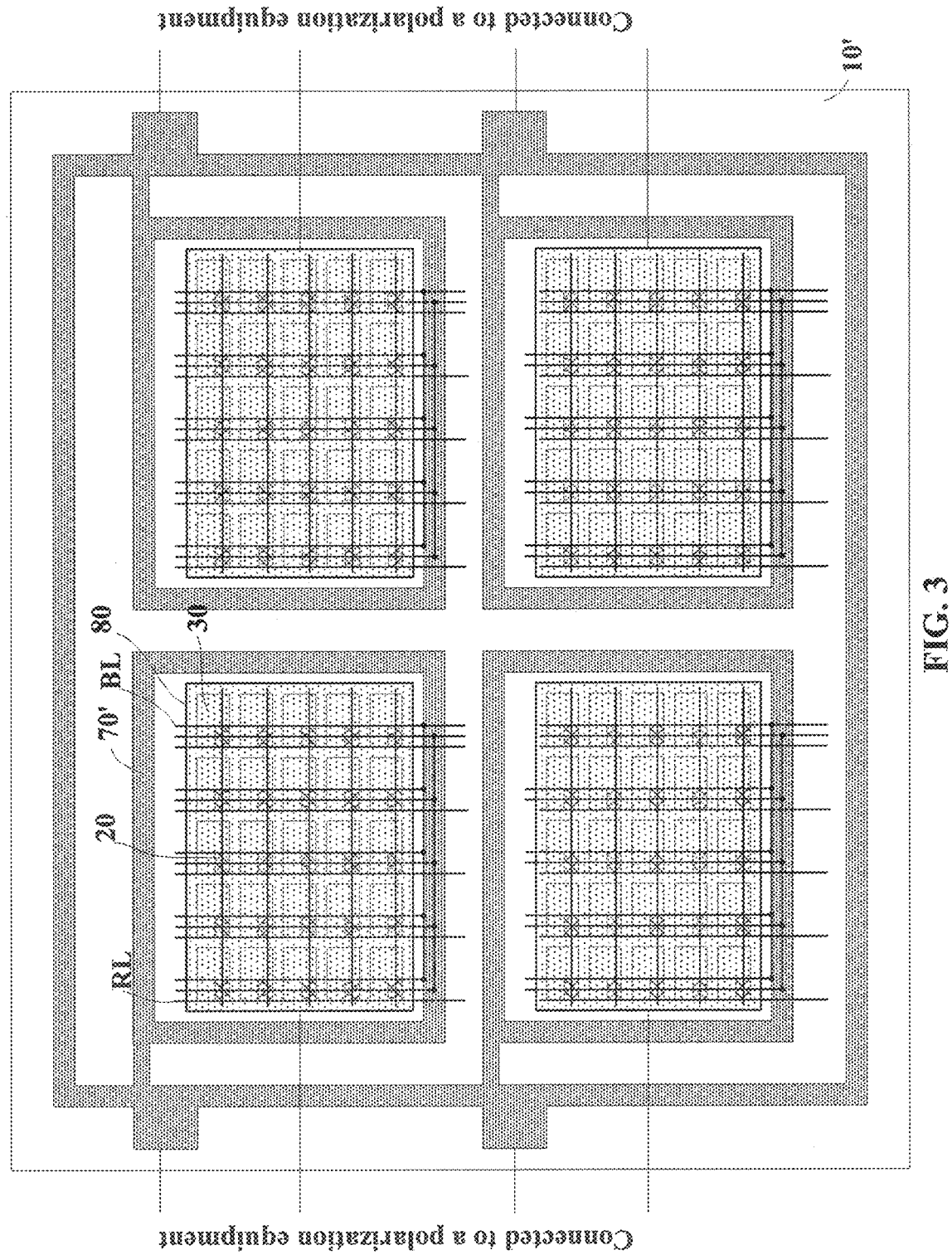
FIG. 3 illustrates a method of polarizing a piezoelectric layer in some embodiments according to the present disclosure.

In some embodiments, the piezoelectric layer 40 may be polarized by providing a first voltage signal to a first polarization electrode, and providing a second voltage signal to a second polarization electrode. FIG. 3 illustrates a method of polarizing a piezoelectric layer in some embodiments according to the present disclosure. Referring to FIG. 3, an array of a plurality of ultrasonic fingerprint sensor apparatuses are first fabricated on a mother substrate 10'. Referring to FIG. 1 and FIG. 3, a respective one of the plurality of ultrasonic sensors is formed to include a first electrode 50, a second electrode 30, and a piezoelectric layer 40 between the first electrode 50 and the second electrode 30. On the mother substrate 10', a plurality of bias lines BL are formed to be respectively electrically connected to a plurality of columns of ultrasonic sensors in the array of the plurality of ultrasonic sensors. A respective one of the plurality of bias lines BL is formed to be electrically connected to the second electrode 30 of a respective one of the plurality of ultrasonic sensors in a respective one of the plurality of columns of ultrasonic sensors.

The polarization equipment is provided. The polarization equipment includes a first polarization electrode 80. An orthographic projection of the first polarization electrode 80 on the mother substrate 10' at least partially overlaps with an orthographic projection of the second electrode 30 on the base substrate and at least partially overlaps with an orthographic projection of the piezoelectric layer 40 on the mother substrate 10'. A second polarization electrode 70' is formed on the mother substrate 10'. An orthographic projection of the second polarization electrode 70' on the mother substrate 10' is substantially non-overlapping with the orthographic projection of the plurality of ultrasonic sensors on the mother substrate 10'. During the polarization process, a first voltage signal (e.g., a high voltage signal) is provided to the first polarization electrode 80, and a second voltage signal (e.g., a low voltage signal) is provided to the second polarization electrode 70', thereby forming an electric field to polarize the piezoelectric material in the piezoelectric layer 40.

As shown in FIG. 3, an orthographic projection of the first polarization electrode 80 on the mother substrate 10' is non-overlapping with an orthographic projection of the second polarization electrode 70' on the mother substrate 10'. It follows that the electric field formed between the first polarization electrode 80 and the second polarization electrode 70', and applied to the piezoelectric layer 40 is a fringe field. It is discovered in the present disclosure that the polarization result using a fringe field results in a relatively small piezoelectric constant of the piezoelectric material in the piezoelectric layer 40. As a result, the amount of charge that is generated by an ultrasonic fingerprint sensor apparatus in response to the pressure is relatively small.

To further improve the polarization result, the present disclosure in some embodiments utilizes a parallel plate field to polarize the piezoelectric layer 40. In some embodiments, the method of fabricating the ultrasonic fingerprint sensor apparatus includes forming an array of a plurality of ultrasonic sensors on a base substrate, wherein a respective one of the plurality of ultrasonic sensors includes a first electrode, a second electrode, and a piezoelectric layer between the first electrode and the second electrode; forming a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors; forming a first polarization electrode on a side of the first electrode away from the second electrode, wherein an orthographic projection of the first polarization electrode on a base substrate at least partially overlaps with an orthographic projection of the second electrode on the base substrate and at least partially overlaps with an orthographic projection of the piezoelectric layer on the base substrate; forming a second polarization electrode, wherein an orthographic projection of the second polarization electrode on a base substrate is substantially non-overlapping with the orthographic projection of the plurality of ultrasonic sensors on the base substrate; electrically connecting the second polarization electrode with the plurality of bias lines; and polarizing the piezoelectric layer by providing a first voltage signal to the first polarization electrode, and providing a second voltage signal to the second electrode through the second polarization electrode and the respective one of the plurality of bias lines during polarizing the piezoelectric layer.

Figure 4:
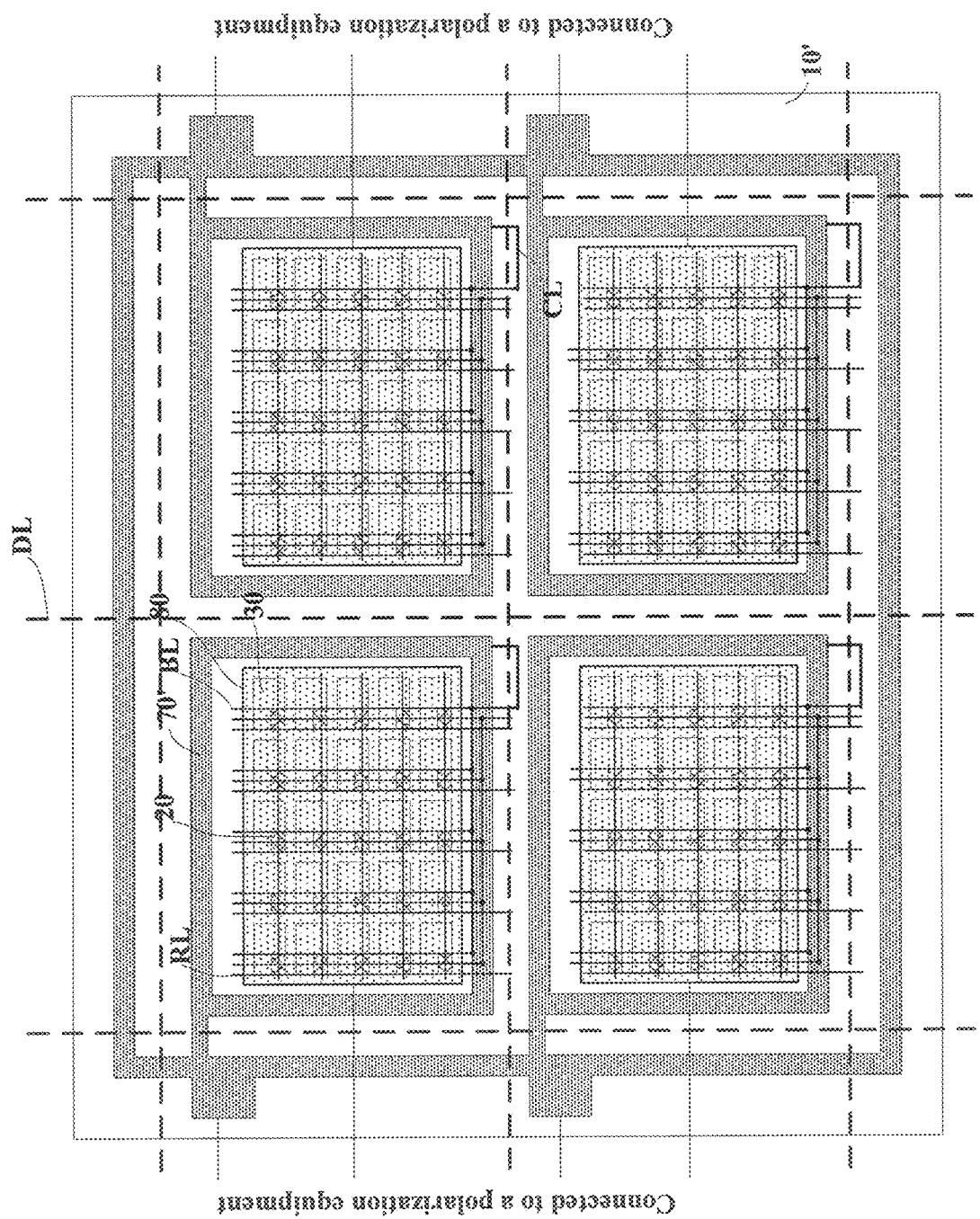
FIG. 4 illustrates a method of polarizing a piezoelectric layer in some embodiments according to the present disclosure.

FIG. 4 illustrates a method of polarizing a piezoelectric layer in some embodiments according to the present disclosure. Referring to FIG. 4, a connecting signal line CL is formed between the second polarization electrode 70' and the plurality of bias lines BL to directly electrically connect the second polarization electrode 70' with the plurality of bias lines BL. By electrically connecting the second polarization electrode 70' with the plurality of bias lines BL, the second voltage signal can be transmitted directly to the second electrode 30. The orthographic projection of the first polarization electrode 80 on the mother substrate 10' at least partially overlaps with an orthographic projection of the second electrode 30 on the mother substrate 10' and at least partially overlaps with an orthographic projection of the piezoelectric layer on the mother substrate 10', an opposing electric field (rather than the fringe field) is formed for polarizing the piezoelectric layer. A relatively large piezoelectric constant of the piezoelectric material in the piezoelectric layer can be achieved as a result of the polarization process. With the increased piezoelectric constant, the amount of charge that can be generated by an ultrasonic fingerprint sensor apparatus in response to the pressure can also be increased, enhancing the sensitivity of the fingerprint signal detection.

In some embodiments, upon completion of polarizing the piezoelectric layer, the connecting signal line CL may be cut to disconnect the second polarization electrode 70' from the plurality of bias lines BL. In some embodiments, upon completion of polarizing the piezoelectric layer, the mother substrate 10' may be cut along a plurality of cutting lines DL, thereby forming a plurality of ultrasonic fingerprint sensor apparatus. As shown in FIG. 4, cutting the mother substrate 10' along the plurality of cutting lines DL simultaneously cuts the connecting signal line CL to disconnect the second polarization electrode 70' from the plurality of bias lines BL.

Figure 5:
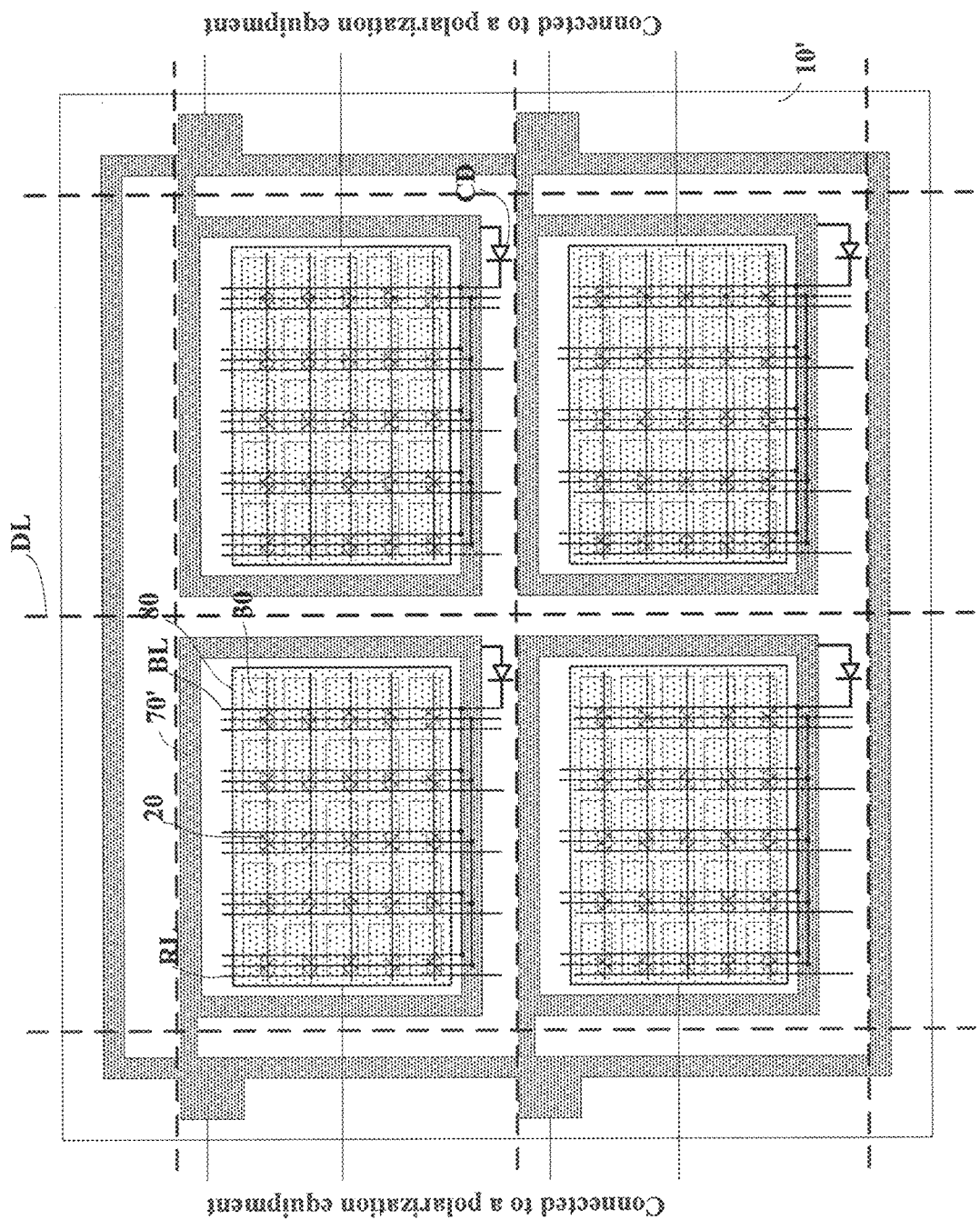
FIG. 5 illustrates a method of polarizing a piezoelectric layer in some embodiments according to the present disclosure.

FIG. 5 illustrates a method of polarizing a piezoelectric layer in some embodiments according to the present disclosure. Referring to FIG. 5, a diode CD is formed between the second polarization electrode 30 and the plurality of bias lines BL to electrically connecting the second polarization electrode 30 with the plurality of bias lines BL. Optionally, the diode CD is maintained in a bias state allowing the second voltage signal to pass from the second polarization electrode 70' to the respective one of the plurality of bias lines BL during polarizing the piezoelectric layer. By maintaining the diode CD in the bias state to electrically connect the second polarization electrode 70' with the plurality of bias lines BL, the second voltage signal can be transmitted directly to the second electrode 30 during the polarization process. As discussed above, an opposing electric field can be formed for polarizing the piezoelectric layer, achieving a relatively large piezoelectric constant of the piezoelectric material in the piezoelectric layer.

In some embodiments, upon completion of polarizing the piezoelectric layer, the diode CD is maintained in a reverse bias state thereby electrically disconnecting the second polarization electrode 70' from the plurality of bias lines BL. By electrically disconnecting the second polarization electrode 30 from the plurality of bias lines BL at the diode CD, normal operation of the ultrasonic fingerprint sensor apparatus will not adversely affected.

Figure 6:
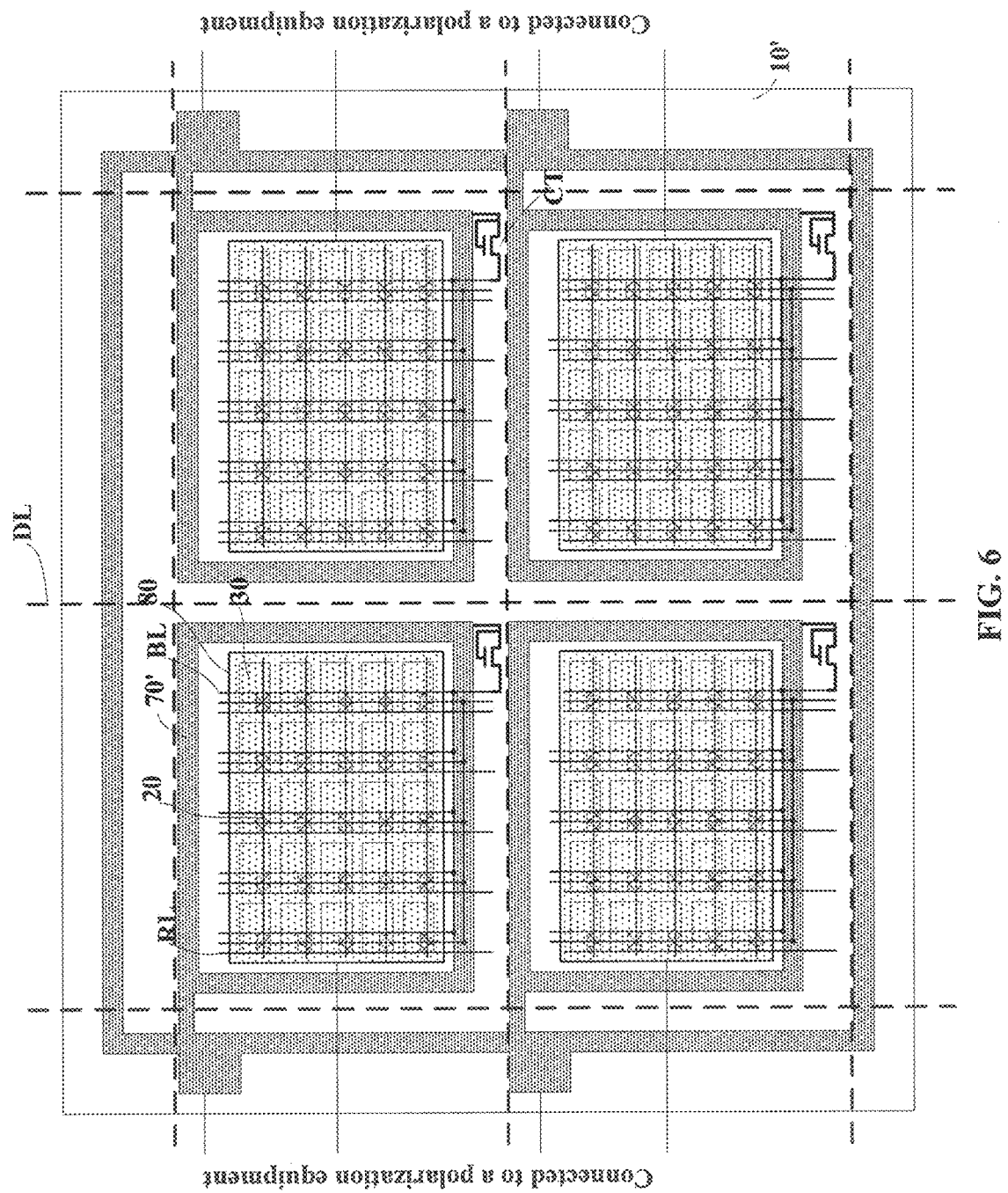
FIG. 6 illustrates a method of polarizing a piezoelectric layer in some embodiments according to the present disclosure.

FIG. 6 illustrates a method of polarizing a piezoelectric layer in some embodiments according to the present disclosure. Referring to FIG. 6, a transistor CT is formed between the second polarization electrode 70' and the plurality of bias lines BL to electrically connecting the second polarization electrode 70' with the plurality of bias lines BL. Optionally, the transistor CT is maintained in an ON state during polarizing the piezoelectric layer, allowing the second voltage signal to pass from the second polarization electrode 70', the transistor CT, and the respective one of the plurality of bias lines BL to the second electrode 30. By maintaining the transistor CT in the ON state to electrically connect the second polarization electrode 70' with the plurality of bias lines BL, the second voltage signal can be transmitted directly to the second electrode 30 during the polarization process. As discussed above, an opposing electric field can be formed for polarizing the piezoelectric layer, achieving a relatively large piezoelectric constant of the piezoelectric material in the piezoelectric layer.

In some embodiments, upon completion of polarizing the piezoelectric layer, the transistor CT is maintained in an OFF state, thereby electrically disconnecting the second polarization electrode 70' from the plurality of bias lines BL. By electrically disconnecting the second polarization electrode 70' from the plurality of bias lines BL at the transistor CT, normal operation of the ultrasonic fingerprint sensor apparatus will not adversely affected.

Referring to FIGS. 3 to 6, in some embodiments, the second polarization electrode 70' is formed to substantially surround the array of a plurality of ultrasonic sensors. Optionally, the second polarization electrode 70' is formed to include a plurality of sub-electrodes respectively in regions corresponding to the plurality of ultrasonic sensors. Each of the plurality of sub-electrodes is formed to substantially surround a respective one of the plurality of ultrasonic sensors.

Referring to FIG. 1 and FIG. 2, in some embodiments, the method further includes forming a plurality of receiver circuits 20. A respective one of the plurality of receiver circuits 20 is electrically connected to the second electrode 30 in the respective one of the plurality of ultrasonic sensors. In some embodiments, the ultrasonic fingerprint sensor apparatus is configured to operate in a time-division mode including a signal transmission mode and a signal detection mode. Optionally, in the signal detection mode of the ultrasonic fingerprint sensor apparatus, the plurality of receiver circuits are configured to receive fingerprint information respectively from the plurality of ultrasonic sensors. Optionally, in the signal transmission mode, the plurality of bias lines are configured to transmit a bias signal respectively to the plurality of columns of ultrasonic sensors in the array of the plurality of ultrasonic sensors. Optionally, forming the respective one of the plurality of receiver circuits 20 includes forming a bias signal diode BD connecting the respective one of the plurality of bias lines BL and the second electrode 30. An anode of the bias signal diode BD is electrically connected to the respective one of the plurality of bias lines BL, and a cathode of the bias signal diode BD is electrically connected to the second electrode 30.

Referring to FIGS. 4 to 6, in some embodiments, upon completion of polarizing the piezoelectric layer, the mother substrate 10' may be cut along a plurality of cutting lines DL, thereby forming a plurality of ultrasonic fingerprint sensor apparatus.

In another aspect, the present disclosure provides an ultrasonic fingerprint sensor apparatus. In some embodiments, the ultrasonic fingerprint sensor apparatus includes an array of a plurality of ultrasonic sensors on a base substrate, wherein a respective one of the plurality of ultrasonic sensors includes a first electrode, a second electrode, and a piezoelectric layer between the first electrode and the second electrode, an orthographic projection of the first electrode on the base substrate at least partially overlaps with an orthographic projection of the second electrode on the base substrate and at least partially overlaps with an orthographic projection of the piezoelectric layer on the base substrate; a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors; a polarization electrode, wherein an orthographic projection of the polarization electrode on a base substrate is substantially non-overlapping with an orthographic projection of the plurality of ultrasonic sensors on the base substrate; a first lead line electrically connected to the polarization electrode; and a second lead line electrically connected to the plurality of bias lines. The first lead line and the second lead line are in a peripheral region of the ultrasonic fingerprint sensor apparatus.

Figure 7:
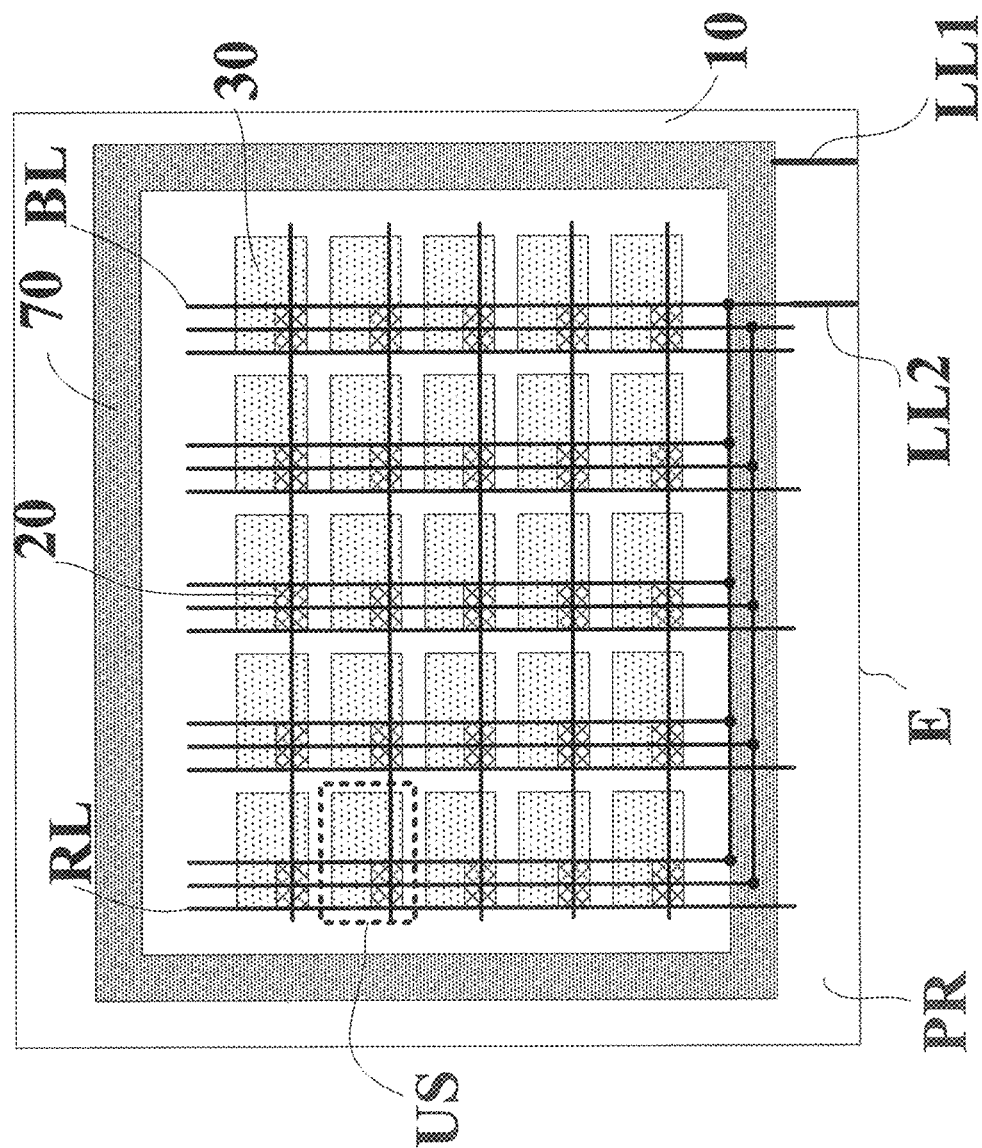
FIG. 7 is a schematic diagram illustrating the structure of an ultrasonic fingerprint sensor apparatus in some embodiments according to the present disclosure.
Figure 8:
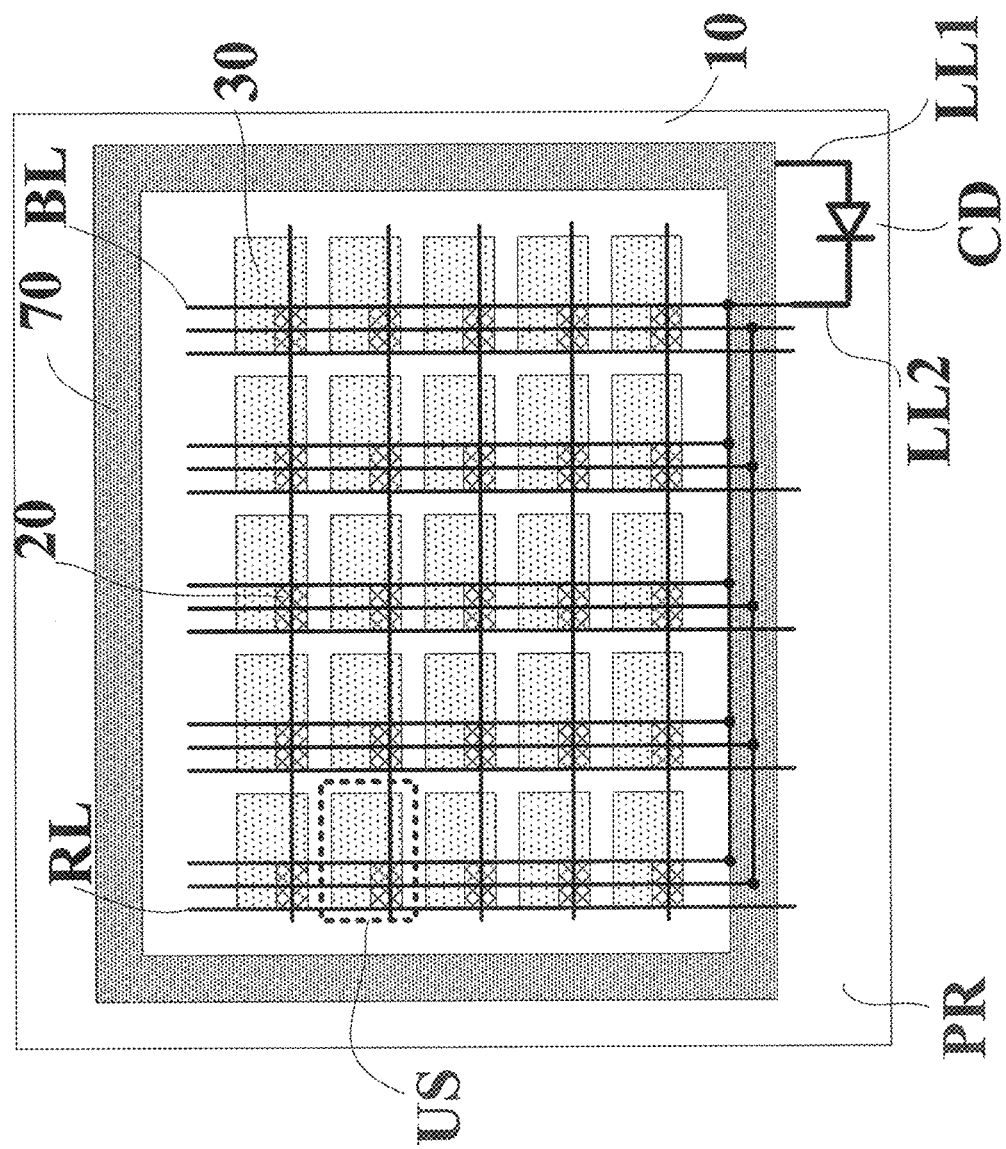
FIG. 8 is a schematic diagram illustrating the structure of an ultrasonic fingerprint sensor apparatus in some embodiments according to the present disclosure.
Figure 9:
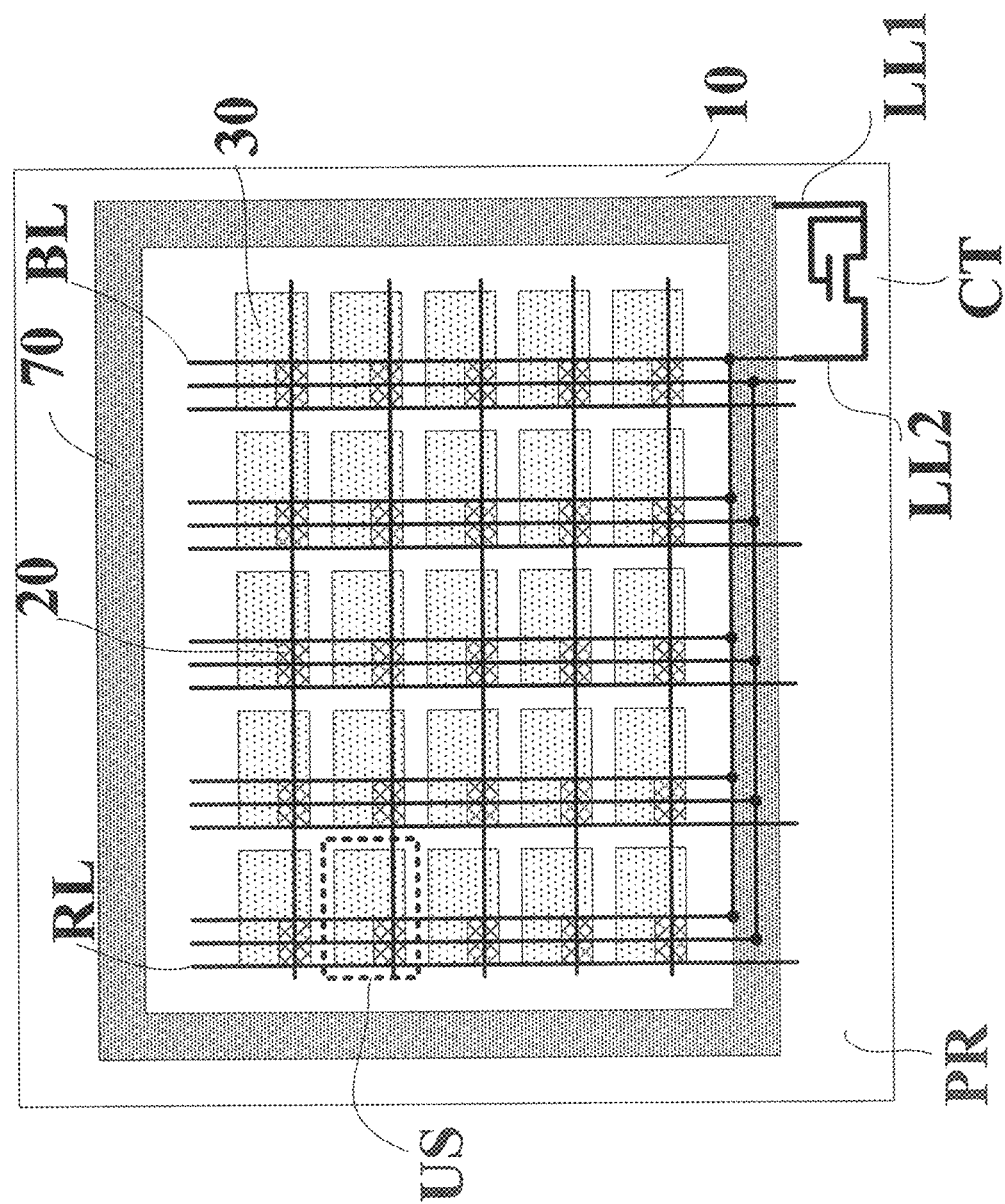
FIG. 9 is a schematic diagram illustrating the structure of an ultrasonic fingerprint sensor apparatus in some embodiments according to the present disclosure.

FIG. 7 is a schematic diagram illustrating the structure of an ultrasonic fingerprint sensor apparatus in some embodiments according to the present disclosure. FIG. 8 is a schematic diagram illustrating the structure of an ultrasonic fingerprint sensor apparatus in some embodiments according to the present disclosure. FIG. 9 is a schematic diagram illustrating the structure of an ultrasonic fingerprint sensor apparatus in some embodiments according to the present disclosure. In some embodiments, FIG. 7 illustrates an ultrasonic fingerprint sensor apparatus fabricated by the method described in FIG. 4. FIG. 8 illustrates an ultrasonic fingerprint sensor apparatus fabricated by the method described in FIG. 5, and FIG. 9 illustrates an ultrasonic fingerprint sensor apparatus fabricated by the method described in FIG. 6.

Referring to FIGS. 1, 2, and 7 to 9, in some embodiments, the ultrasonic fingerprint sensor apparatus includes an array of a plurality of ultrasonic sensors US on a base substrate 10, wherein a respective one of the plurality of ultrasonic sensors US includes a first electrode 50, a second electrode 30, and a piezoelectric layer 40 between the first electrode 50 and the second electrode 30. An orthographic projection of the first electrode 50 on the base substrate 10 at least partially overlaps with an orthographic projection of the second electrode 30 on the base substrate 10 and at least partially overlaps with an orthographic projection of the piezoelectric layer 40 on the base substrate 10. Optionally, the orthographic projection of the first electrode 50 on the base substrate 10 covers the orthographic projection of the piezoelectric layer 40 on the base substrate 10. Optionally, the orthographic projection of the second electrode 30 on the base substrate 10 covers the orthographic projection of the piezoelectric layer 40 on the base substrate 10.

In some embodiments, the ultrasonic fingerprint sensor apparatus further includes a plurality of bias lines BL respectively electrically connected to a plurality of columns of ultrasonic sensors in the array of the plurality of ultrasonic sensors US. A respective one of the plurality of bias lines BL is configured to be electrically connected to the second electrode 30 of a respective one of the plurality of ultrasonic sensors US in a respective one of the plurality of columns of ultrasonic sensors.

In some embodiments, the ultrasonic fingerprint sensor apparatus further includes a polarization electrode 70. Optionally, an orthographic projection of the polarization electrode 70 on a base substrate 10 is substantially non-overlapping with an orthographic projection of the plurality of ultrasonic sensors US on the base substrate 10.

In some embodiments, the ultrasonic fingerprint sensor apparatus further includes a first lead line LL1 electrically connected to the polarization electrode 70; and a second lead line LL2 electrically connected to the plurality of bias lines BL. The first lead line LL1 and the second lead line LL2 are in a peripheral region PR of the ultrasonic fingerprint sensor apparatus. Optionally, the polarization electrode 70 is a ring structure substantially surrounding the plurality of ultrasonic sensors US. Optionally, the polarization electrode 70 encircles an area in which the plurality of ultrasonic sensors US are disposed. Optionally, the first lead line LL1 and the second lead line LL2 are outside the area encircled by the polarization electrode 70.

As used herein the term "substantially surrounding" refers to surrounding at least 50% (e.g., at least 60%, at least 70%, at least 80%, at least 90%, at least 95%, at least 99%, and 100%) of a perimeter of an area. As used herein, the term "encircle" refers to "to pass completely around." The term encircle is not limited to mean literally forming a circle, although it may include forming a circle, but may also include entirely or partially forming a perimeter around, entirely or partially surrounding, and/or being located at near an entire or partial periphery of that which is being encircled.

Referring to FIG. 7, in some embodiments, the first lead line LL1 and the second lead line LL2 are isolated from each other; the first lead line LL1 extends from a respective one of the plurality of bias signal line BL to an edge E of the base substrate 10, and the second lead line LL2 extends from the polarization electrode 70 to the edge E of the base substrate 10. All other bias signal lines of the plurality of bias signal lines BL other than the one directly connected to the second lead line LL2 do not extend to the edge E of the base substrate 10.

Referring to FIG. 8, in some embodiments, the ultrasonic fingerprint sensor apparatus further includes a diode CD connecting the polarization electrode 70 and the plurality of bias lines BL. Optionally, an anode of the diode CD is electrically connected to the polarization electrode 70; and a cathode of the diode CD is electrically connected to the plurality of bias lines BL. Optionally, the diode CD is maintained in a reverse bias state thereby electrically disconnecting the polarization electrode 70 from the plurality of bias lines BL at the diode CD.

Referring to FIG. 9, in some embodiments, the ultrasonic fingerprint sensor apparatus further includes a transistor CT connecting the polarization electrode 70 and the plurality of bias lines BL. Optionally, a gate electrode and a source electrode of the transistor CT are commonly electrically connected to the polarization electrode 70; and a drain electrode of the transistor CT is electrically connected to the plurality of bias lines BL. Optionally, the transistor CT is maintained in an OFF state, thereby electrically disconnecting the polarization electrode 70 from the plurality of bias lines BL at the transistor CT.

Referring to FIGS. 1, 2, and 7 to 9, in some embodiments, the ultrasonic fingerprint sensor apparatus further includes a plurality of receiver circuits 20 respectively connected to the plurality of ultrasonic sensors US. A respective one of the plurality of receiver circuits 20 is electrically connected to the second electrode 30 in the respective one of the plurality of ultrasonic sensors US. In some embodiments, the ultrasonic fingerprint sensor apparatus is configured to operate in a time-division mode including a signal transmission mode and a signal detection mode. Optionally, in the signal detection mode of the ultrasonic fingerprint sensor apparatus, the plurality of receiver circuits 20 are configured to receive fingerprint information respectively from the plurality of ultrasonic sensors US. Optionally, in the signal transmission mode, the plurality of bias lines BL are configured to transmit a bias signal respectively to the plurality of columns of ultrasonic sensors in the array of the plurality of ultrasonic sensors US. Optionally, a respective one of the plurality of receiver circuits 20 includes a bias signal diode BD connecting the respective one of the plurality of bias lines BL and the second electrode 30. An anode of the bias signal diode BD is electrically connected to the respective one of the plurality of bias lines BL, and a cathode of the bias signal diode BD is electrically connected to the second electrode 30.

Referring to FIG. 2, the respective one of the plurality of receiver circuits 20 in some embodiments further includes a first transistor T1, a second transistor T2, a third transistor T3, and a capacitor C. A first electrode of the capacitor C is connected to the second electrode 30, a second electrode of the capacitor C is connected to ground. A gate electrode of the first transistor T1 is connected to a respective one of a plurality of reset signal line RST, a source electrode of the first transistor T1 is connected to the second electrode 30 and a gate electrode of the second transistor T2, and a drain electrode of the first transistor T1 is connected to a respective one of the plurality of bias signal lines BL. A gate electrode of the second transistor T2 is connected to the second electrode 30 and the source electrode of the first transistor T1, a source electrode of the second transistor T2 is connected to a respective one of a plurality of signal lines Ap, and a drain electrode of the second transistor T2 is connected to a source electrode of the third transistor T3. A gate electrode of the third transistor T3 is connected to a respective one of a plurality of selection signal lines SEL, a source electrode of the third transistor T3 is connected to the drain electrode of the second transistor T2, and a drain electrode of the third transistor T3 is connected to a respective one of a plurality of read lines RL.

In another aspect, the present disclosure further provides a method of operating an ultrasonic fingerprint sensor apparatus. In some embodiments, and referring to FIG. 8, the method includes electrically disconnecting the polarization electrode 70 from the plurality of bias lines BL at the diode CD by maintaining the diode CD in a reverse bias state. In some embodiments, and referring to FIG. 9, the method includes electrically disconnecting the polarization electrode 70 from the plurality of bias lines BL at the transistor CT by maintaining the transistor CT in an OFF state.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An ultrasonic fingerprint sensor apparatus, comprising:
   an array of a plurality of ultrasonic sensors on a base substrate, wherein a respective one of the plurality of ultrasonic sensors comprises a first electrode, a second electrode, and a piezoelectric layer between the first electrode and the second electrode, an orthographic projection of the first electrode on the base substrate at least partially overlaps with an orthographic projection of the second electrode on the base substrate and at least partially overlaps with an orthographic projection of the piezoelectric layer on the base substrate;
   a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors;
   a polarization electrode, wherein an orthographic projection of the polarization electrode on a base substrate is substantially non-overlapping with an orthographic projection of the plurality of ultrasonic sensors on the base substrate;
   a first lead line electrically connected to the polarization electrode; and
   a second lead line electrically connected to the plurality of bias lines;
   wherein the first lead line and the second lead line are in a peripheral region of the ultrasonic fingerprint sensor apparatus.

2. The ultrasonic fingerprint sensor apparatus of claim 1, further comprising a diode connecting the polarization electrode and the plurality of bias lines.

3. The ultrasonic fingerprint sensor apparatus of claim 2, wherein an anode of the diode is electrically connected to the polarization electrode; and
   a cathode of the diode is electrically connected to the plurality of bias lines.

4. The ultrasonic fingerprint sensor apparatus of claim 1, further comprising a transistor connecting the polarization electrode and the plurality of bias lines.

5. The ultrasonic fingerprint sensor apparatus of claim 4, wherein a gate electrode and a source electrode of the transistor are commonly electrically connected to the polarization electrode; and
   a drain electrode of the transistor is electrically connected to the plurality of bias lines.

6. The ultrasonic fingerprint sensor apparatus of claim 1, wherein the first lead line and the second lead line are isolated from each other.

7. The ultrasonic fingerprint sensor apparatus of claim 1, wherein the polarization electrode is formed to substantially surround the array of a plurality of ultrasonic sensors.

8. The ultrasonic fingerprint sensor apparatus of claim 1, further comprising a plurality of receiver circuits;
   wherein a respective one of the plurality of receiver circuits is electrically connected to the second electrode in the respective one of the plurality of ultrasonic sensors;

wherein the ultrasonic fingerprint sensor apparatus is configured to operate in a time-division mode comprising a signal transmission mode and a signal detection mode;

the plurality of receiver circuits are configured to receive fingerprint information respectively from the plurality of ultrasonic sensors in the signal detection mode of the ultrasonic fingerprint sensor apparatus; and the plurality of bias lines are configured to transmit a bias signal in the signal transmission mode respectively to the plurality of columns of ultrasonic sensors in the array of the plurality of ultrasonic sensors.

9. A method of operating an ultrasonic fingerprint sensor apparatus;

wherein the ultrasonic fingerprint sensor apparatus comprises:

an array of a plurality of ultrasonic sensors on a base substrate, wherein a respective one of the plurality of ultrasonic sensors comprises a first electrode, a second electrode, and a piezoelectric layer between the first electrode and the second electrode, an orthographic projection of the first electrode on the base substrate at least partially overlaps with an orthographic projection of the second electrode on the base substrate and at least partially overlaps with an orthographic projection of the piezoelectric layer on the base substrate;

a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors;

a polarization electrode, wherein an orthographic projection of the polarization electrode on a base substrate is substantially non-overlapping with an orthographic projection of the plurality of ultrasonic sensors on the base substrate;

a first lead line electrically connected to the polarization electrode;

a second lead line electrically connected to the plurality of bias lines; and a diode connecting the polarization electrode and the plurality of bias lines;

wherein the first lead line and the second lead line are in a peripheral region of the ultrasonic fingerprint sensor apparatus;

wherein the method comprises electrically disconnecting the polarization electrode from the plurality of bias lines by maintaining the diode in a reverse bias state.

10. A method of operating an ultrasonic fingerprint sensor apparatus;

wherein the ultrasonic fingerprint sensor apparatus comprises:

an array of a plurality of ultrasonic sensors on a base substrate, wherein a respective one of the plurality of ultrasonic sensors comprises a first electrode, a second electrode, and a piezoelectric layer between the first electrode and the second electrode, an orthographic projection of the first electrode on the base substrate at least partially overlaps with an orthographic projection of the second electrode on the base substrate and at least partially overlaps with an orthographic projection of the piezoelectric layer on the base substrate;

a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors;

a polarization electrode, wherein an orthographic projection of the polarization electrode on a base substrate is substantially non-overlapping with an orthographic projection of the plurality of ultrasonic sensors on the base substrate;

a first lead line electrically connected to the polarization electrode;

a second lead line electrically connected to the plurality of bias lines; and a transistor connecting the polarization electrode and the plurality of bias lines;

wherein the first lead line and the second lead line are in a peripheral region of the ultrasonic fingerprint sensor apparatus;

wherein the method comprises electrically disconnecting the polarization electrode from the plurality of bias lines by maintaining the transistor in an OFF state.

11. A method of fabricating an ultrasonic fingerprint sensor apparatus of claim 1, comprising:

forming an array of a plurality of ultrasonic sensors on a base substrate, wherein a respective one of the plurality of ultrasonic sensors comprises a first electrode, a second electrode, and a piezoelectric layer between the first electrode and the second electrode;

forming a plurality of bias lines respectively electrically connected to a plurality of columns of ultrasonic sensors in the array of the plurality of ultrasonic sensors, wherein a respective one of the plurality of bias lines is configured to be electrically connected to the second electrode of a respective one of the plurality of ultrasonic sensors in a respective one of the plurality of columns of ultrasonic sensors;

forming a first polarization electrode on a side of the first electrode away from the second electrode, wherein an orthographic projection of the first polarization electrode on a base substrate at least partially overlaps with an orthographic projection of the second electrode on the base substrate and at least partially overlaps with an orthographic projection of the piezoelectric layer on the base substrate;

forming a second polarization electrode, wherein an orthographic projection of the second polarization electrode on a base substrate is substantially non-overlapping with the orthographic projection of the plurality of ultrasonic sensors on the base substrate;

electrically connecting the second polarization electrode with the plurality of bias lines; and polarizing the piezoelectric layer by providing a first voltage signal to the first polarization electrode, and providing a second voltage signal to the second electrode through the second polarization electrode and the respective one of the plurality of bias lines during polarizing the piezoelectric layer.

12. The method of claim 11, wherein the second polarization electrode is formed to substantially surround the array of a plurality of ultrasonic sensors.

13. The method of claim 11, wherein electrically connecting the second polarization electrode with the plurality of bias lines comprises forming a diode between the second polarization electrode and the plurality of bias lines; and the diode is maintained in a bias state allowing the second voltage signal to pass from the second polarization electrode to the respective one of the plurality of bias lines during polarizing the piezoelectric layer.

14. The method of claim 13, upon completion of polarizing the piezoelectric layer, further comprising maintaining the diode in a reverse bias state thereby electrically disconnecting the second polarization electrode from the plurality of bias lines.

15. The method of claim 11, wherein electrically connecting the second polarization electrode with the plurality of bias lines comprises forming a transistor between the second polarization electrode and the plurality of bias lines;
the transistor is maintained in an ON state during polarizing the piezoelectric layer; and
the second voltage signal is provided to the second electrode through the second polarization electrode, the transistor, and the respective one of the plurality of bias lines during polarizing the piezoelectric layer.

16. The method of claim 15, upon completion of polarizing the piezoelectric layer, further comprising maintaining the transistor in an OFF state, thereby electrically disconnecting the second polarization electrode from the plurality of bias lines.

17. The method of claim 11, wherein electrically connecting the second polarization electrode with the plurality of bias lines comprises forming a connecting signal line between the second polarization electrode and the plurality of bias lines, thereby directly electrically connecting the second polarization electrode with the plurality of bias lines.

18. The method of claim 17, further comprising cutting the connecting signal line upon completion of polarizing the piezoelectric layer, thereby disconnecting the second polarization electrode from the plurality of bias lines.

19. The method of claim 18, wherein the array of a plurality of ultrasonic sensors are formed in a respective one of a plurality of regions of a mother substrate;
wherein, upon completion of polarizing the piezoelectric layer, the method further comprising cutting the mother substrate thereby forming the ultrasonic fingerprint sensor apparatus;
wherein cutting the connecting signal line is performed during cutting the mother substrate.

20. The method of claim 11, further comprising forming a plurality of receiver circuits;
wherein a respective one of the plurality of receiver circuits is electrically connected to the second electrode in the respective one of the plurality of ultrasonic sensors;
wherein the ultrasonic fingerprint sensor apparatus is configured to operate in a time-division mode comprising a signal transmission mode and a signal detection mode;
the plurality of receiver circuits are configured to receive fingerprint information respectively from the plurality of ultrasonic sensors in the signal detection mode of the ultrasonic fingerprint sensor apparatus; and
the plurality of bias lines are configured to transmit a bias signal in the signal transmission mode respectively to the plurality of columns of ultrasonic sensors in the array of the plurality of ultrasonic sensors.

* * * * *